United States Patent [19]

Byrnes et al.

[11] 4,155,731
[45] May 22, 1979

[54] FIBER FORMING BUSHING CONSTRUCTION

[75] Inventors: Gregory W. Byrnes; Richard E. Ralls, both of Eugene, Oreg.

[73] Assignee: The Greickor Company, Eugene, Oreg.

[21] Appl. No.: 868,611

[22] Filed: Jan. 11, 1978

[51] Int. Cl.² .......................................... C03B 37/02
[52] U.S. Cl. ................................... 65/1; 13/6; 65/11 W; 65/356; 65/374 M
[58] Field of Search ........... 65/1, 2, 11 R, 11 W, 65/374 M, 356; 13/6

[56] References Cited

U.S. PATENT DOCUMENTS

| | | | |
|---|---|---|---|
| 2,489,508 | 11/1949 | Stalego | 65/1 |
| 3,492,104 | 1/1970 | Glaser | 65/11 W |
| 3,511,916 | 5/1970 | Sinclair et al. | 65/1 X |
| 3,536,470 | 10/1970 | Britchard et al. | 65/356 X |
| 3,920,430 | 11/1975 | Carey | 65/1 |
| 3,972,702 | 8/1976 | McCormick et al. | 65/1 |
| 3,988,135 | 10/1976 | Coggin | 65/1 |
| 4,026,689 | 5/1977 | Higginbothom | 65/1 |

FOREIGN PATENT DOCUMENTS

632507 12/1961 Canada ........................................ 65/1

*Primary Examiner*—Robert L. Lindsay, Jr.
*Attorney, Agent, or Firm*—Kolisch, Hartwell, Dickinson & Stuart

[57] ABSTRACT

In apparatus for heat-softening and attenuating glass material into fibers, an improved low temperature electrical resistance bushing having extremely thin side walls and other electricity conducting components running from end to end in the bushing, relative to the base plate for both direct and marble-melt bushings. The thin side walls enable a low temperature bushing to operate with temperatures less than 2250° F., because the thin side walls draw proportionately less current than the base plate. Additional improvements for providing a low temperature bushing include, for a marble-melt bushing, a funnel which is mounted on the top wall and a cooling tube mounted adjacent a bottom portion of the funnel. Another improvement includes the use of auxiliary end plates mounted adjacent the end walls of the bushing for channeling electrical current to the base plate. A further improvement in a marble-melt bushing includes the provision of opposed side walls which are inclined outwardly as well as extend upwardly from the base plate. Upper side wall sections are inclined inwardly from an associated side wall. The result is a construction in which a bridge of glass material may be supported somewhat by the side walls.

28 Claims, 10 Drawing Figures

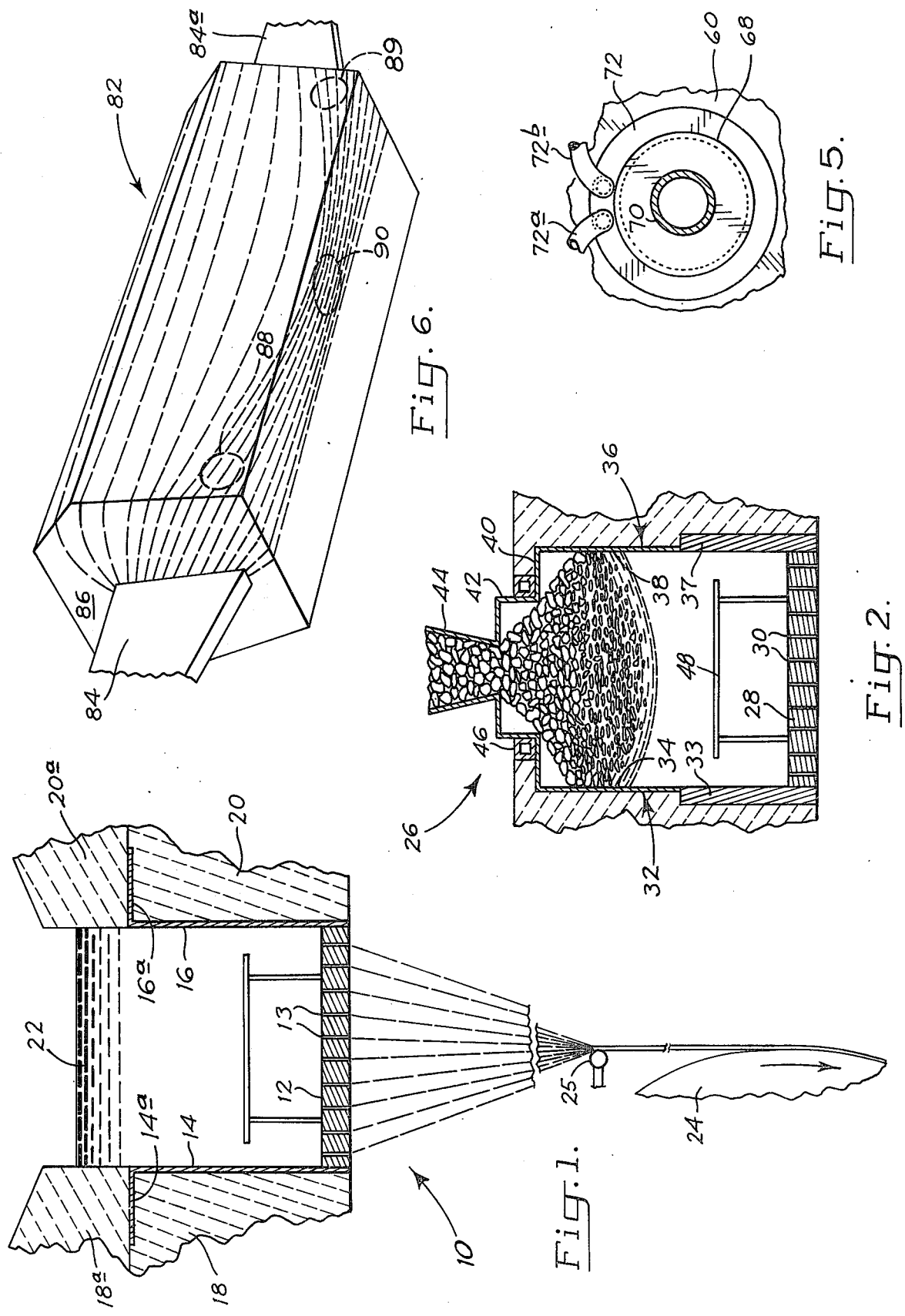

FIBER FORMING BUSHING CONSTRUCTION

BACKGROUND AND SUMMARY OF THE INVENTION

The present invention relates to apparatus for heat-softening and attenuating glass material into fibers, and more particularly to an electrical resistance furnace known in the art as a bushing. A bushing is used to melt, condition and fiberize the glass material.

Prior art bushings, whether utilized in a direct-melt or marble-melt configuration, are almost always constructed of platinum-rhodium alloys. Such alloys are used because they are highly corrosion resistant and can accommodate high operating temperatures in excess of 2450° Fahrenheit. In prior art marble-melt bushings, it has generally been the practice to provide substantially greater temperatures in the melting and conditioning of glass material than is actually necessary for fiberization. Specifically, as set forth in U.S. Pat. Nos. 3,013,095 and 3,048,640, molten glass must be heated at a temperature upwardly of 2300° F. This same teaching is also set forth in U.S. Pat. No. 3,615,314 wherein it is stated that a bushing must be maintained generally at a temperature of about 2400°-2500° F. It must be emphasized that if the glass is to be maintained at such temperatures, upwardly of 2300° F., the side walls of the bushing, as well as the top wall, will be at an even higher temperature.

However, it has been determined that actual fiberization temperature of most common glasses is not in excess of 2250° F. Prior art bushing constructions have required that the side wall temperatures be several hundred degrees higher than the base plate temperature in order to maintain the base plate temperature at the fiberization temperature, which may be in the order of 2000°-2250° F. Higher side wall temperatures are required because the base plate will radiate heat off into the atmosphere. However, the overall effect is to provide a bushing which is of "high heat" mode, i.e. a bushing in which temperatures above 2250° F. occur.

Prior art bushing constructions, in the marble-melt bushing mode, also generally utilize a construction in which the side walls are joined at a seam at their upper ends to a basket. The basket serves to retain glass material during the melting phase. However, the seam does not generally contact glass material and therefore provides a juncture of extremely high temperature. This can lead to bushing failures especially in the case where it is desired to construct a bushing of a nonplatinum-rhodium alloy.

Accordingly, it is a general object of the present invention to provide an electrical resistance bushing for use in an apparatus for heat-softening and attenuating glass material into fibers, and more particularly, it is an object to provide a low temperature bushing. This is achieved by a construction which ensures that the base plate and side walls are maintained in approximately the same temperature range, i.e. in the range of approximately 2000°-2250° F. Maintaining this temperature range is accomplished by a novel dimensioning of the relative thicknesses of the base plate and side walls. In the case of a marble-melt bushing, dimensioning of the top wall relative to the base plate is also an important criteria.

Specifically, a low temperature bushing of the present invention is accomplished in the direct-melt mode by dimensioning the base plate with an average thickness at least four times greater than the average thickness of each side wall. With respect to a marble-melt bushing having a top wall, the present invention contemplates that the base plate will be dimensioned with an average thickness of at least eight times the average thickness of an upper section of each side wall over at least about fifty percent of the vertical dimension, measured along the length of the bushing. The base plate is also dimensioned to be at least eight times as thick as the average thickness of the top wall.

With the above set forth dimensions as a criteria for direct-melt and marble-melt bushings, it has been found that the base plate and side walls may be maintained at approximately the fiberization temperature for most common glasses. This results in a low temperature bushing enabling the use of materials alternative to platinum-rhodium alloys. Exemplary materials may include nickel-chromium alloys, stainless steels, nickel-tungsten alloys, etc.

Another object of the present invention is to provide a direct-melt or marble-melt bushing with a relatively thick base plate, as described above, with the additional provision of auxiliary end plates mounted adjacent each end wall of the bushing. Specifically, each auxiliary end plate will be spaced from its adjacent end wall and secured to an adjacent terminal and to the base plate. Because each auxiliary end plate is spaced from its adjacent end wall, electric current will be channeled from the terminal directly to the base plate without straying through the lower corners of the side walls thereby eliminating deleterious effects on the temperature pattern of the bushing. This also results in a substantially uniform base plate temperature.

Still another object of the present invention is to provide a marble-melt bushing, dimensioned as described above, with a plurality of material-directing funnels which are mounted on the top wall of the bushing. Surrounding a peripheral portion of the funnel, adjacent its connection to the top wall, is a cooling means provided for maintaining a temperature which will prevent glass material from adhering or accumulating in a region adjacent its entry through an opening into the interior of the bushing. It is contemplated that a collar will be positioned between the end of the funnel and the opening in the top wall which is cooled by the cooling means.

A still further object of the present invention is to provide a marble-melt bushing, dimensioned as described above, with opposed side walls which are inclined and extend upwardly and outwardly from the base plate. Each of the side walls is joined, at its upper end, to an upper side wall section which is inclined inwardly toward the longitudinal axis of the bushing. This construction results in the provision of a relatively narrow top wall. Furthermore, the outwardly inclined side walls provide a structure which serves to "bridge" molten material as it is being melted from a solid condition to a more viscous condition.

These and additional objects and advantages of the present invention will be more readily understood from a consideration of the drawings and the detailed description of the preferred embodiment.

BRIEF DESCRIPTION OF THE DRAWINGS

FIG. 1 is an end elevation view, taken in cross-section, of a direct-melt bushing used in an apparatus for heat-softening and attenuating material into glass fibers, glass fibers shown being drawn onto a rotatable drum disposed therebeneath;

FIG. 2 is an end elevation view, taken in cross-section, of a marble-melt bushing used in an apparatus for heat-softening and attenuating material into glass fibers;

FIG. 5 is a view taken along lines 5—5 of FIG. 3 and illustrates mounting of a cooling tube adjacent entry of material into the bushing;

FIG. 6 is a perspective view of a portion of a bushing, having a relatively thick base plate, illustrating current paths from a bushing terminal along the bushing's end, side and bottom walls;

DETAILED DESCRIPTION OF THE PREFERRED EMBODIMENTS

Figure 3:
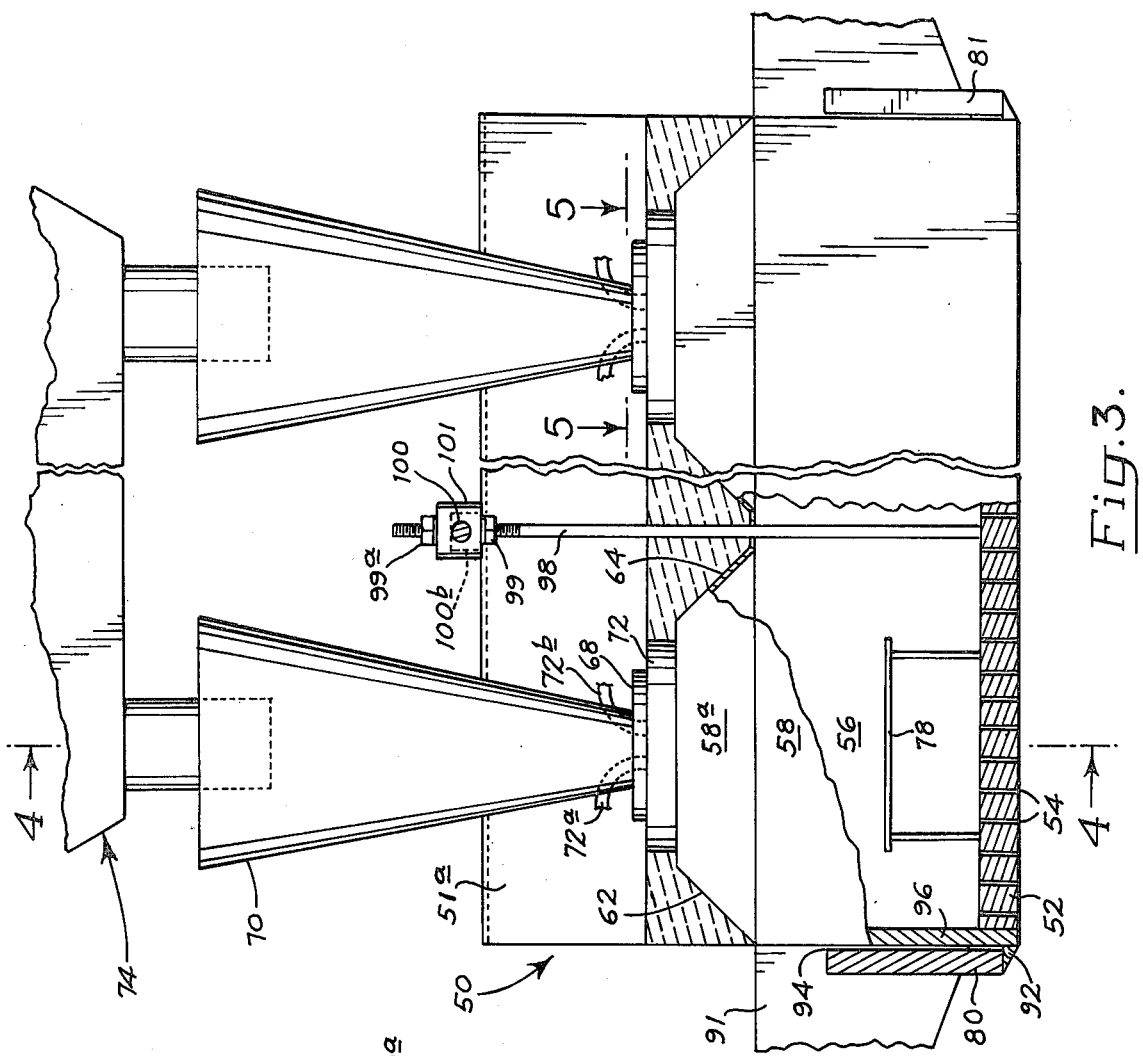
FIG. 3 is a side elevation view, shown partially in cross-section of another embodiment of a marble-melt bushing in accordance with the present invention.

Turning now to the drawings, and referring initially to FIG. 1, a bushing according to a first embodiment of the present invention is generally designated at 10. Bushing 10 is mounted in an apparatus, known in the art as a direct-melt furnace, (though it could be used for melting cullet, etc.) for heat-softening and attenuating glass material into fibers. Bushing 10 includes a horizontally positioned base plate 12 having a plurality of fiber forming apertures 13 extending therethrough. A pair of opposed, spaced-apart side walls 14, 16 are joined to base plate 12 and extend vertically upwardly therefrom. Side walls 14, 16 include flanges 14a, 16a respectively which are mounted into associated refractory material 18, 18a and 20, 20a respectively. An outer supporting frame (not shown) mounts the insulating material.

Although only a portion of a direct-melt apparatus is shown in FIG. 1, it must be remembered that molten material indicated at 22 would normally be channeled or fed into bushing 10 from a forehearth. Thus, bushing 10 would normally be provided with an open-top construction as illustrated. Further considering FIG. 1, it can be seen that heat softened material from the molten material is directed downwardly through apertures 13 and wound onto a rotatable drum 24 in conventional manner. A gathering shoe is schematically shown at 25.

According to the present invention, the specific dimensions of a direct-melt bushing such as bushing 10 are critical if the bushing is to function as a low temperature bushing. As mentioned previously, known bushings are generally constructed from platinum-rhodium alloys such as ten percent rhodium-platinum or twenty percent rhodium-platinum. It is also known to construct bushings for specialized applications of zirconium-stabilized platinum which is highly resistant to distortion. Such bushings would be "high temperature" bushings, i.e. bushings in which upper wall temperatures may rise to 2300° F. and above.

However, the present invention contemplates that base plate 12 will be dimensioned with an average thickness at least four times greater than the average thickness of each side wall 14, 16. Furthermore, it has been found advantageous to provide a bushing wherein bushing 10, when viewed in transverse cross-section, includes base plate 12 with a cross-sectional area in the range of at least forty-five percent of the total cross-sectional area of side walls 14, 16 and base plate 12 taken together.

With the above construction, it is possible to maintain a base plate temperature in a certain fiberization range without the side wall temperature greatly exceeding that range. Prior art bushing constructions necessarily required that precious metals be used because the side walls would reach significantly higher temperatures than the base plate. Stainless steels or nickel-chromium alloys could not be employed because they could not sustain the high side wall temperatures required to maintain a relatively thin base plate at a desired temperature. However, with the above construction, the relatively thin side walls draw much less electrical current and therefore generate much less heat and consequently enjoy low operating temperatures. With the average thickness of base plate 12 being at least four times greater than the average thickness of side walls 14, 16, it is possible to maintain both the base plate and the side walls in the range of about 2000°-2250° F. which is necessary for proper conditioning of glass in an attenuating process. The bushing can then be accurately referred to as a "low temperature" bushing. It has been found that if base plate 12 were not dimensioned with a thickness at least four times greater than the average thickness of side walls 14, 16, side wall temperatures could exceed 2250° which would prevent the construction of a stainless steel or nickel-chromium alloy bushing. Nickel-chromium bushings would experience rapid oxidation and deterioration if temperatures exceeded the range of about 2250° F.

Additionally, base plate 12 is significantly stronger because of its relatively thick dimension and also permits greater lengths and widths to be manufactured without accompanying warpage or distortion during high operating temperatures. A thick base plate is also easily cast with nozzles in situ thereby saving fabrication costs. Another advantage resides in the fact that nozzles may be machined into the base plate for extending from apertures 13. Specifically, through machining an annular cavity surrounding a portion of an aperture, the bottom of the base plate may be formed so that a nozzle extends outwardly. Additionally, press-fit nozzle tips may be premanufactured on a screw machine or turret lathe and mounted in an individual aperture because the thick base plate provides a substantial material thickness for accommodating a press-fit. Also, tips may be spot welded or attached by adhesive ceramic to the base plate. It is to be noted that press-fit nozzles could be made of different alloys, i.e. could be constructed of a more corrosion-resistant material than the base plate itself.

Additional advantages of a relatively thick base plate reside in the fact that convection currents, which are normally associated with the molten mass held by a bushing do not appreciably influence the base plate. For instance, a thin base plate would not retain as much heat as a thick base plate and therefore convection currents would more readily disturb a thin base plate's temperature. Also, it is to be noted that a thick base plate is less effected by external temperature influences because the base plate has a higher heat content due to its thickness. An even temperature is provided at the meniscus or the point at which a fiber forms after passing from an aperture or nozzle. A relatively thick base plate also provides more intense thermal conditioning as glass passes through the apertures and reduces the probability of crystals being passed outwardly.

Some bushing constructions require that cooling fins be located adjacent the meniscus. In conventional bushing constructions, if the bushing plate becomes warped, it could contact the cooling fins and upset the heat content of the base plate. However, with a relatively thick base plate, as set forth above, significant widths may be provided which enable the apertures or nozzles to be spread far apart and thus reduce the radiation from one nozzle to another. It has been found that nozzles can be placed in excess of one-half inch apart on a relatively thick base plate and this facilitates restart if fibers should become broken in a fiber forming process. Widely spaced nozzles reduce the probability that a bead which has formed after a fiber has broken will contact and break other fibers.

With reference now directed to FIG. 2, another embodiment of the present invention is illustrated and pertains to a bushing generally indicated at 26 used in a marble-melt process. Specifically, bushing 26 is used in a process in which marbles, cullet, rod or other material are deposited into the interior of the bushing for melting. Bushing 26 is of the electrical resistance type and includes a horizontally positioned base plate 28 having a plurality of fiber-forming apertures 30 extending therethrough. Opposed, spaced-apart side walls are provided, each of which may include wall sections having different side wall thicknesses, when viewed in cross-section. For instance, base plate 28 is secured to a side wall 32 which includes a section 33 from which upwardly extends a less thick, upper section 34. Similarly, a side wall 36 is secured to the other side of base plate 28 and includes a section 37 from which upwardly extends a less thick, upper section 38.

The bushing construction shown in FIG. 2 refers to a bushing used for melting heat-softenable material and contemplates that base plate 28 will be dimensioned with an average thickness at least eight times greater than the average thickness of each upper section 34, 38. Furthermore, each of the upper sections with the above-described thickness is contemplated as occupying at least fifty percent of its associated side wall height measured from end to end in the bushing. The base plate thickness dimension is also at least eight times greater than the average thickness of a top wall which is indicated at 40. It is noted that it is necessary to provide base plate 28 with a thickness at least eight times greater than the thickness of upper sections 34, 38 as well as top wall 40 in order to keep the current flow in the upper section and top wall approximately one-eighth or less than the current flow in the base plate so that the side walls and top wall do not become overly hot. The reason for the eight to one ratio resides in the fact that a base plate is not encased in refractory and is highly disposed to heat losses through radiation whereas side walls are encased in refractory and are thus not disposed to high radiant heat losses. The bottom portion of the side walls can radiate a significant quantity of heat through the base plate. According to the present invention, the upper side wall sections are dimensioned thin, relative to the base plate, so that they will generate less heat.

Bushing 26 also includes a collar 42. Extending upwardly from collar 42 is a funnel means indicated at 44. A cooling means such as a cooling tube 46 surrounds collar 42 for preventing marble or cullet material from sticking to collar 42 or in interior walls adjacent to the region cooled by cooling tube 46. Details of collar 42, funnel means 44 and cooling tube 46 will be more fully described hereinafter with reference to a third embodiment shown in FIGS. 3 and 4. Also, a baffle means indicated at 48 will receive a more detailed discussion at a later point.

Figure 4:
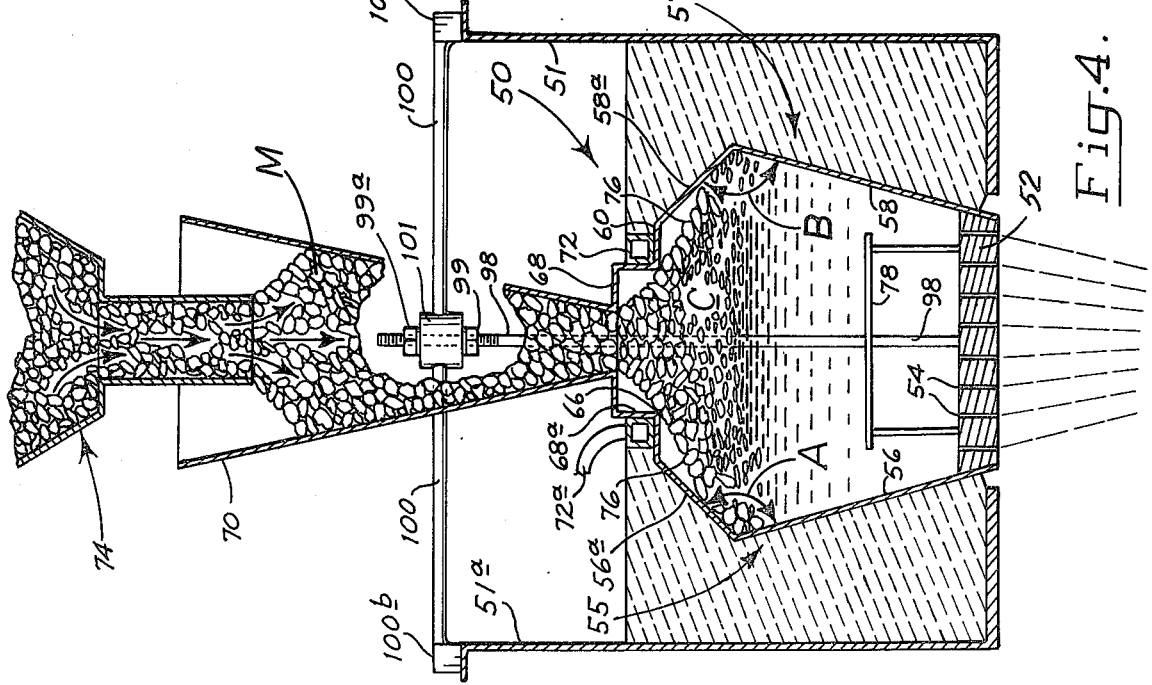
FIG. 4 is an end elevation view, taken in cross-section, along lines 4—4 of FIG. 3.

Turning now to FIGS. 3 and 4, another embodiment of the present invention contemplates a marble-melt bushing indicated at 50. Bushing 50, as shown in FIG. 4, includes a base plate 52 horizontally positioned and including a plurality of fiber forming apertures 54. Opposed, spaced-apart side walls are generally indicated at 55, 57. Extending upwardly from base plate 52 and inclined outwardly relative thereto are lower side wall sections 56, 58. Each side wall 55, 57 includes an upper side wall section such as sections 56a, 58a joined at obtuse angles to lower side wall sections 56, 58 respectively. A relatively narrow top wall 60 extends between sections 56a, 58a and joins them. A frame having opposed sides 51, 51a supports the bushing in suitable refractory material.

As shown in FIG. 3, additional upper side wall sections 62, 64 are inclined upwardly toward top wall 60. Top wall 60 is provided with an opening 66 (other openings are also provided as shown in FIG. 3) and a collar means 68, preferably of circular periphery, is mounted on top wall 60. Mounted to and extending upwardly from collar means 68 is a funnel means 70. Depending upon the length of bushing 50, a plurality of funnel means are provided at spaced-apart locations as suggested by FIG. 3. It should also be noted that a fluid-conducting coolant tube 72 surrounds collar means 68. Details and advantages of coolant tube 72 will be described at a later point.

Returning to FIG. 4, it can be seen that base plate 52 is dimensioned with an average thickness at least eight times greater than the average thickness of upper side wall sections 56a, 58a, and a portion of lower side wall sections 56, 58 for at least fifty percent of the height of side walls 55, 57 measured from end to end in the bushing. The base plate thickness dimension is also at least eight times greater than the average thickness of upper side wall sections 62, 64 and top wall 60. The purpose of such an eight to one ratio is substantially as set forth for the previously described marble-melt bushing embodiment, i.e. to ensure that a low temperature bushing is provided wherein the side walls and base plate are maintained within approximately the same temperature range. It is to be noted that marble or cullet material generally designated at M, is funneled down through funnel means 70 from a feeder assembly generally designated at 74 into a region defined by collar means 68.

As shown in FIG. 5, collar means 68 is substantially surrounded by coolant tube 72. An inlet is indicated at 72a and an outlet at 72b. Thus, with coolant fluid being continuously circulated through coolant tube 72, (any suitable coolant fluid may be used) it can be appreciated that collar means 68 will be maintained at a relatively cool temperature when compared with side walls 56, 58 and upper side wall sections 56a, 58a. Additionally, top wall 60 while being somewhat hotter than collar means 68, will nonetheless not achieve a significantly high temperature. Thus, as material M descends downwardly through funnel means 70, it will not stick or build up on the interior periphery 68a of collar means 68 or on the interior surface of top wall 60 beneath coolant tube 72. The material will descend generally at an angle represented by the sloped lines 76 into the interior of bushing 50. Because of the relatively cool temperatures of collar means 68 and top wall 60, no material will stick thereto but rather will be channeled into contact with upper sections 56a, 58a. The upper sections are maintained at generally the fiberization temperature and cause rapid melting of the material.

It must be appreciated that the sloped wall configuration of bushing 50, i.e. as shown in FIG. 4, provides several distinct advantages. For instance, it is preferable to increase the area of glass contact and decrease the area which is not in glass contact. For instance, in conventional bushings, there is provided a large top wall surface which can become hot and cause rapid oxidation and deterioration of the top wall alloy. The increased glass contact with the side walls, as shown in FIG. 4 of the present invention ensures relatively uniform melting of material M with only a small region not actually in contact with the material.

Bushing 50, which includes angled or inclined side walls 56, 58 ensures that there is a "bridging effect". More specifically, it can be seen that obtuse angles A, B defined by walls 56, 56a and 58, 58a respectively, enable a narrow top wall 60 to be provided plus a structure in which softened material in a region C may be at least temporarily supported to ensure that complete melting of the material results. Furthermore, it is to be noted that a baffle means such as indicated at 78 is provided directly beneath collar means 68 and funnel means 70. Baffle means 78 includes an apertured plate mounted on legs above base plate 52 and is provided to reduce hydrostatic pressure over apertures 54 and to retard the downward movement of unmelted glass. This may be required when it is needed to improve the fiber forming characteristics at the meniscus.

It has been found that it may be necessary to retard downward pressure and downward movement of particulate glass because material may be in too solid of a condition adjacent the interior portion of bushing 52. The material will be reduced to a molten state adjacent the side walls, but additional retarding of downward pressure may be required in order to ensure that adequate heat input is directed to the material located interiorly of the bushing. It has been found that even downward flow across a horizontal gradient will be optimized by providing funnel means 70, the inclined wall structure, and baffle means 78. It is to be noted that a baffle means will be provided beneath each funnel means and top wall opening.

Figure 7:
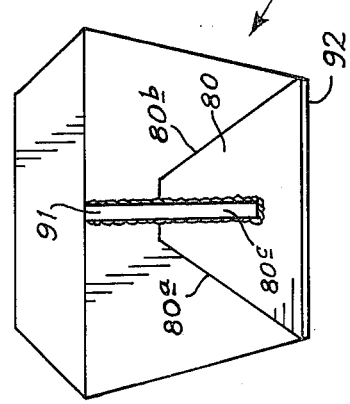
FIG. 7 is an end elevation view of a portion of a bushing according to the present invention illustrating use of an auxiliary end plate adjacent the terminals so that electrical current will be channeled to the base plate.

Another feature of the present invention, and one which may be employed in each of the above embodiments, is the provision of an auxiliary end plate provided on opposite ends of the bushing. Such end plates 80, 81 are shown in FIGS. 3 and 7. Before a discussion of the details and advantages of the end plates are pursued, reference to FIG. 6 is required. A bushing 82 having a relatively thick base plate is shown in perspective from beneath in FIG. 6 and includes terminals 84, 84a. During input of electrical current through the terminals, it has been found that the current will be directed across end wall 86 generally in the current pattern as shown. The current will follow the path of least resistance and therefore a high portion of the current will be directed to the edge of end wall 86 and across the side wall as shown in generally curved gradient lines which increase in concentration toward the region occupied by a base plate. This concentration will result in localized "hot spots" such as indicated at 88, 89 and 90. Similar "hot spots" are located on the other side as only one-half of the gradient lines are shown for purposes of clarity. These "hot spots", occurring as shown, will greatly increase the temperature of the side walls and central base plate portion thereby providing a result which can only be accommodated by a platinum or platinum alloy bushing. In order to alleviate such "hot spots" the present invention includes the additional improvement of providing auxiliary end plates 80, 81 as shown in FIGS. 3 and 7.

Specifically, as shown in FIGS. 3 and 7 end plate 80 is constructed with inclined sides 80a, 80b and is provided with a notch or recess 80c so that it may be welded, along the recess, to a terminal such as terminal 91 provided on bushing 50. Another weld is indicated at 92 and secures the bottom of end plate 80 to a position adjacent base plate 52. It is to be noted that an air space or gap, indicated at 94 is provided between the interior face of end plate 80 and an end wall 96 of the bushing. It is imperative to have such an air space or to provide insulating material in the space so that current will be channeled from terminal 91 through end plate 80 directly into base plate 52. No welds other than those indicated should be provided because the object of such a construction is to ensure that the path of conductivity to the side walls is eliminated with conductivity being channeled only to the base plate.

Current is directed into base plate 52 so that the overall heat content of base plate 52 is maintained. It may or may not be necessary to provide insulating material between the inside face of end plate 80 and the outside face of an end wall depending upon the oxidation characteristics of a particular metal. The important thing to remember, however, is that the provision of the novel auxiliary end plates will serve to channel electrical current directly into the base plate from its ends thereby maintaining the base plate at a substantially uniform temperature.

Returning to FIGS. 3 and 4, it will be appreciated that the relatively thick base plate construction of the present invention, in all of the above embodiments, enables the connection thereto of a bushing supporting mechanism including a support rod 98 and transversely extending brace 100. Support rod 98 is anchored to the base plate and extends upwardly therefrom. Brace 100 includes a yoke member 101 which is slidably mounted on rod 98. Opposed nuts 99, 99a are threadably engaged with the rod on opposite sides of the yoke. Elements 100a, 100b are provided on opposite ends of the brace and are slidable along flanges provided on opposed sides 51, 51a of the frame.

Thus, the rod and brace define a "dynamic support" in that adjustment of the nuts may be made to compensate for expansion of the bushing as it heats up. Adjustments in the vertical direction, lengthwise and transversely are accommodated by the supporting mechanism. Further, it is to be noted that the rod could be a thermocouple sheath if desired. A thermocouple provided for measuring the temperature of base plate 52 may be secured to the base plate at its upper surface between apertures 54. The thermocouple may be insulated with MgO and sheathed in a heat and corrosion resistant alloy. The relatively thick construction of base plate 52 permits the use of such a MgO thermocouple because it allows the use of nozzles spaced-apart far enough to permit the thermocouple to be secured to the base plate between nozzles. Also, the thickness of the base plate permits the drilling of a thermocouple receiving bore. It may be advisable to provide a multiplicity of spaced-apart thermocouples, extending generally in the longitudinal direction of the bushing for monitoring base plate temperature. Further, each of the thermocouples may be appropriately secured to a bracing member thereby adding structural integrity to the bushing proper.

Figure 8:
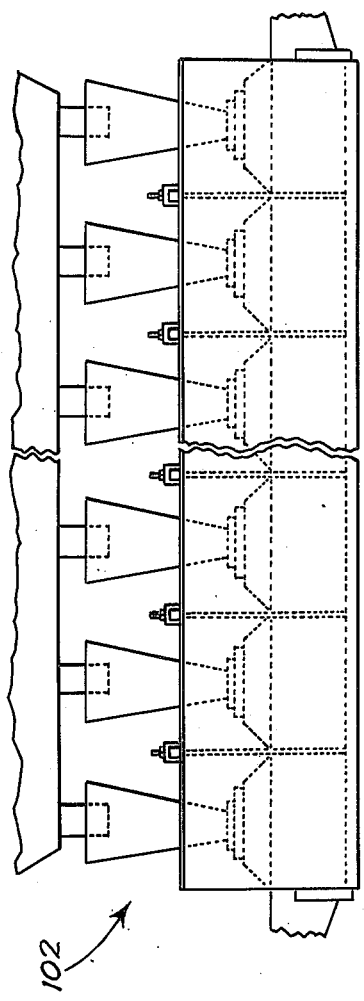
FIG. 8 is a side elevation view, reduced in size from the other drawings, showing the construction of a long bushing, in the range of 6-8 feet, including a plurality of material directing funnels and cooling tubes.

Another embodiment of the present invention is shown in FIG. 8 and includes an extremely long bushing, when considered in view of the prior art, generally designated at 102. Bushing 102 may be provided with a length as much as 6–8 feet or more because of the relatively thick base plate construction and other novel features of the present invention. As shown, a plurality of dynamic supporting mechanisms may be provided for structural integrity. The base plate is substantially more rigid than existing bushing base plate constructions and enables substantial bushing lengths to be feasible especially when employed with the above-described dynamic supporting mechanism. Additionally, it can be appreciated that a plurality of separate funnel means may be provided beneath a material dispensing feed assembly. Each of the funnel means is directed into the top wall of the bushing via a collar means as previously described. Each of the collar means is provided with a coolant tube for the purposes as outlined with reference to FIGS. 3 and 4.

Figure 9:
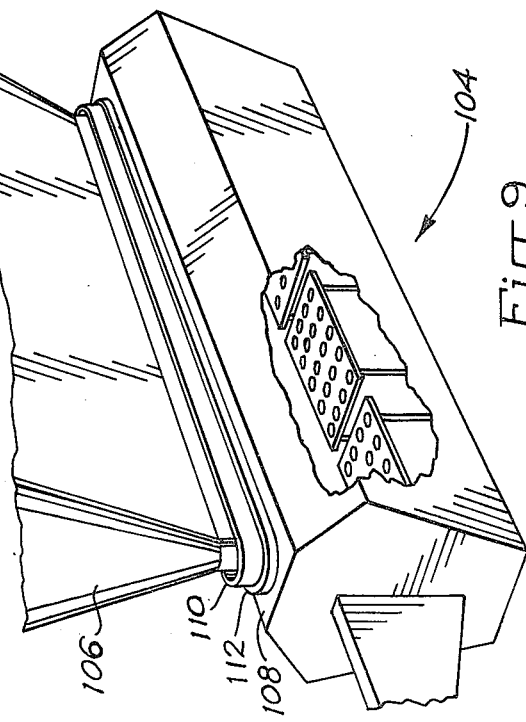
FIG. 9 is a perspective view, illustrating another embodiment of the present invention including an elongate continuous funnel for directing material into the bushing.

Turning to FIG. 9, another embodiment of the present invention contemplates the provision of a relatively long bushing wherein a continuous funnel means is provided. Specifically, a bushing 104 includes a feeding or funnel means 106 which extends substantially the length of the bushing. Funnel means 106 is supported from above (not shown) and is not connected to collar means 110. Bushing 104 is provided with a top wall 108 having a continuous opening on which is mounted an elongate collar means 110. Surrounding collar means 110 is a continuous coolant tube 112. The bushing shown in FIG. 9 includes a portion broken away in order to better illustrate the provision of a plurality of baffle means disposed beneath funnel means 106. As shown, each of the baffle means is spaced a small distance apart from adjacent baffle means in order to break the path of end to end conductivity and thereby prevent substantial heat build up on the baffle means. Of course, the baffle means may be constructed of relatively nonconductive material, if desired, so that electrical current is not channeled into the baffle means from the base plate. The continuous funnel means will ensure continuously even downward pressure and movement of particulate material across horizontal gradients thus improving fiber forming characteristics.

Figure 10:
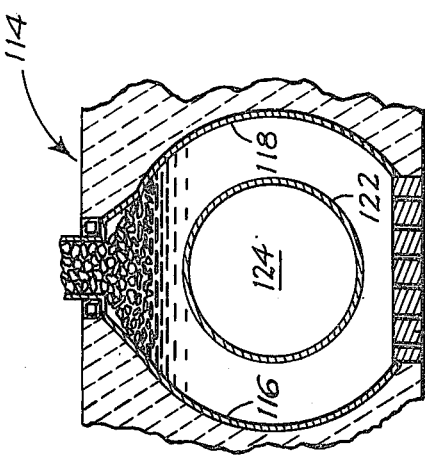
FIG. 10 is an end elevation view of a bushing, taken in cross-section, showing an embodiment including an internal core for enhancing melting of glass by virture of improved radiation resulting from the relative closeness of the walls of the internal core and the side walls of the bushing.

A last embodiment of the present invention is illustrated in cross-section in FIG. 10 and includes a bushing provided with a core. The bushing includes a base plate and side wall construction utilizing an eight to one ratio similar to that described for the embodiments of FIGS. 2–4. As illustrated, a bushing generally indicated at 114 is provided with circular or curved side walls 116, 118 which extend upwardly from a relatively thick base plate 120. Mounted internally of bushing 114 is a cylindrical member or core 122 which defines an internal space 124. Core 122 is provided in order to enhance melting of glass through improved radiation because of the relative closeness of walls 116, 118 and the outer surface of core 122. It must be remembered that core 122 conducts electricity and is therefore heated. The use of core 122 is primarily effective in the situation prior to establishing a regular fiber throughput pattern. For instance, it is known that bushings can become relatively hot along their upper side wall sections prior to throughput being established. This is because a flow of incoming cold glass is not established during startup. The glass is initially residing in the bushing and is not moving. After movement of the glass starts (i.e. when throughput is initiated) heat may be reduced. During the startup phase, it may be advisable to transfer some type of cooling fluid through a region 124 so that side walls 116, 118 may be cooled during the startup phase. Once throughput is initiated, it is contemplated that the cooling fluid through region 124 would be eliminated or reduced and then the walls of core 122 and side walls 116, 118 would simultaneously radiate heat towards each other in order to substantially improve the thermal characterisitics and heating capabilities of the bushing. While it has been disclosed to provide some type of cooling fluid to channel through region 124, it must be remembered that the basic concept disclosed in FIG. 10 contemplates the provision of a heat sink in order to provide cooling for the upper wall portions of the side walls when they become too hot prior to the establishment of throughput.

The above-description, with reference to the preferred embodiments, sets forth both direct-melt and marble-melt bushings having relatively thick base plates compared to the thickness of the bushing's side walls. It is known that many repeated attempts have been directed toward developing bushings made of less expensive, alternative materials from the conventional platinum or platinum-rhodium alloy bushings but none have been practical, primarily because they have required auxiliary heat sources which result in higher operating costs. However, the present invention provides a startling breakthrough in bushing construction because it enables the use of nonprecious metal alloys to be advantageously used. Stainless steels or nickel-chromium alloys may be readily employed in either a direct-melt or marble-melt bushing as long as the base plate and side wall thickness dimensions, as described above, are employed. Substantial savings in fabrication and operating costs are realized when a nonprecious metal bushing is used. Also from the above, it should be clear that the present invention enables bushings of nonprecious metals to be constructed which are extremely rugged and adapted to perform without substantial deformation or warpage over extended operating periods.

There are other significant advantages present in the bushing construction utilizing a relatively thick base plate as outlined above. For instance, because the bushing operates at a relatively low temperature, it will enjoy a longer life. This concept could be readily employed with conventional platinum-rhodium alloy bushings. Additionally, the long life is accompanied by an extremely rugged construction. For instance, if the bushing is to be constructed of a nickel-chromium alloy, damage would not result if other metals contacted the bushing. Conversely, platinum tends to readily alloy with other metals when at high temperatures. Therefore, if cooling fins or other objects inadvertently come in contact with the nozzles of a platinum bushing, irreparable damage usually occurs.

The ruggedness of a bushing utilizing the relatively thick base plate of the present invention also permits blocked nozzles to be readily rodded. This refers to the use of a thin wire or rod which is inserted through a plugged orifice in the nozzle. Such rodding may advantageously be used in a nickel-chromium alloy bushing but cannot be used with platinum-rhodium alloy bushings.

Another advantage of the present invention resides in the use of a nickel-chromium alloy bushing having a relatively thick base plate which can fiberize scrap window glass cullet. Such cullet is generally contaminated with lead putty and alumunium extrusion scraps which cannot be segregated with magnets or other readily available means. Such contaminants would ruin a conventional platinum-rhodium alloy bushing but can be withstood in a nickel-chromium alloy bushing or bushing constructed of some nonprecious metal alloys.

Still another advantage of the present invention resides in the use of the auxiliary end plates, as described above, to remove "hot spots" at the lower corners of the side walls and on the middle region of the base plate. The result is a very uniform base plate temperature which enables the attenuation of uniformly dimensioned fibers. A uniform base plate temperature, at the fiberization temperature, ensures that uniform quality fibers will be drawn.

In conventional marble bushings, a problem resides in that convection currents may be present within the molten mass of the bushing. The convection currents can cause problems in that colder glass may be present in areas of the base plate directly beneath an inlet funnel. Another problem resides in the fact that pockets of stagnation may occur between convection currents and in areas outside of their path. However, with the low temperature bushing of the present invention, convection currents are substantially eliminated. This is achieved because a highly molten bath is not required in the mid-section of the bushing because glass descends toward the base plate in an even downward flow steadily increasing to fiberization temperature. There are no convection currents because the glass is too viscous to flow in currents until it hits the base plate where it immediately passes through the orifices and is fiberized. This concept is known as using liquid zones of progressively decreasing viscosities and can be readily achieved with the relatively thick base plate construction utilized with the other features, as outlined above, for ending convection currents, pockets of stagnation and attendant crystalization. An advantage of having no convection currents, no pockets of stagnation and no attendant crystalization resides in the fact that a bushing, constructed as outlined above, may be brought up to operating conditions much faster than conventional bushings.

Still another advantage of the present invention resides in the fact that the relatively thick base plate will not be affected by heat variations caused by extraneous thermal influences. This is because the relatively thick base plate retains a high heat content and a low thermal conductivity. Thus, even if menici cooling tubes come in contact with the base plate, no adverse affects result on the base plate.

It should also be noted that automatic temperature controls generally are not necessary for a low temperature bushing constructed in accordance with the principles of the present invention in most applications. This is because the bushing is not as susceptible to extraneous thermal influences as high temperature bushings are.

While the present invention has been described with reference to the foregoing preferred embodiments, it will be apparent to those skilled in the art that other changes in form and detail may be made within the scope of the present invention as defined in the appended claims.

It is claimed and desired to secure by Letters Patent:

1. In apparatus for heat-softening and attenuating material into fibers, an electrical resistance bushing with an open top comprising:
   a horizontally positioned base plate having aperture means for fiber-forming extending therethrough;
   spaced-apart side walls joined to said base plate and extending upwardly therefrom; and
   opposed end walls interconnecting said base plate and extending upwardly therefrom; and
   opposed end walls interconnecting said base plate and said side walls, each of said end walls including a terminal extending outwardly therefrom;
   said base plate being dimensioned with an average thickness at least four times greater than the average thickness
   said bushing, when viewed in transverse cross-section, including a base plate having a cross-sectional area in the range of at least forty-five percent of the cross-sectional area of said walls and said base plate taken together.

2. In apparatus for heat-softening and attenuating material into fibers, an electrical resistance bushing comprising:
   a horizontally positioned base plate having a plurality of fiber forming apertures extending therethrough;
   spaced-apart side walls joined to said base plate and extending upwardly therefrom;
   a top wall provided with a material receiving opening interconnecting said side walls;
   opposed end walls interconnecting said base plate and said side walls; and
   hollow core means extending through the interior of said bushing for directing a fluid medium therethrough;
   wherein said base plate is dimensioned with an average thickness at least eight times greater than the average thickness of each side wall over at least fifty percent of the height of the side wall measured along an upper portion thereof for the length of the side wall.

3. The apparatus of claim 1 further including auxiliary conducting means for channeling electrical current to said base plate, said auxiliary conducting means being secured to each of said terminals and extending toward said base plate for connection thereto.

4. The apparatus of claim 3 wherein said auxiliary conducting means includes an end plate which is spaced-apart from its associated end wall.

5. The apparatus of claim 4 wherein said end plates include opposed, inclined sides which taper from said base plate toward an associated terminal.

6. The apparatus of claim 1 wherein baffle means are provided between the open top of said bushing and said base plate for reducing hydrostatic pressure over the apertures.

7. The apparatus of claim 1 further including thermocouple means for measuring base plate temperature, said thermocouple means being secured to said base plate and extending upwardly between said side walls.

8. The apparatus of claim 1 further including thermocouple means and support means, said thermocouple means being secured to said base plate and extending upwardly therefrom between said side walls for connection to said support means, said thermocouple means being provided for measuring temperature of said base plate.

9. The apparatus of claim 1 wherein said bushing is constructed of a metal not including platinum.

10. In apparatus for heat-softening and attenuating material into fibers, an electrical resistance bushing mounted in a frame comprising:
a horizontally positioned base plate having aperture means for fiber-forming extending therethrough;
spaced-apart side walls joined to said base plate and extending upwardly therefrom;
a top wall provided with an opening interconnecting said side walls adjacent their upper portion; and
opposed end walls interconnecting said base plate and said side walls, each of said end walls including a terminal extending therefrom;
said base plate being dimensioned with an average thickness at least eight times greater than the average thickness of an upper section of each side wall over at least fifty percent of the height of the side wall measured along the length of the side wall, said base plate also being dimensioned with an average thickness at least eight times greater than the average thickness of said top wall.

11. The apparatus of claim 10 wherein said bushing is constructed of a metal not including platinum.

12. The apparatus of claim 10 further including baffle means provided between said opening and said base plate for reducing hydrostatic pressure over the apertures.

13. The apparatus of claim 10 further including thermocouple means for measuring temperature of said base plate, said thermocouple means being secured to said base plate and extending upwardly between said side walls.

14. The apparatus of claim 10 further including thermocouple means and support means, said thermocouple means being secured to said base plate and extending upwardly therefrom between said side walls for connection to said support means, said thermocouple means being provided for measuring temperature of said base plate.

15. The apparatus of claim 10 further including a supporting rod extending between said side walls and connected to said base plate and a transversely extending brace mounted on and movable relative to said frame, said brace including means for receiving and holding said rod wherein said rod is adjustable in a vertical direction relative to said brace.

16. The apparatus of claim 10 further including funnel means mounted adjacent said bushing for directing the material into said bushing.

17. The apparatus of claim 16 wherein said funnel means includes sloped sides which are inclined substantially the length of said top wall for providing an elongate, continuous opening.

18. The apparatus of claim 16 further including cooling means provided adjacent the bottom portion of said funnel means for maintaining a temperature, adjacent said opening, which will prevent the material from adhering and accumulating in a region adjacent its entry through said opening.

19. The apparatus of claim 18 further including a collar means interposed between said funnel means and said top wall, said cooling means including a fluid conducting tube disposed adjacent said collar means for providing cooling to said collar means.

20. The apparatus of claim 19 wherein said fluid conducting tube is positioned for encompassing a substantial portion of the periphery of said collar means.

21. The apparatus of claim 10 further including auxiliary conducting means for channeling electrical current to said base plate, said auxiliary conducting means being secured to each of said terminals and extending toward said base plate for connection thereto.

22. The apparatus of claim 21 wherein said auxiliary conducting means includes an end plate which is spaced-apart from its associated end wall.

23. The apparatus of claim 22 wherein said end plate includes opposed, inclined sides which taper from said base plate toward an associated terminal.

24. In apparatus for heat-softening and attenuating material into fibers, an electrical resistance bushng mounted in a frame comprising:
a horizontally positioned base plate having aperture means for fiber forming extending therethrough;
spaced-apart lower side wall sections joined to said base plate extending upwardly and inclined outwardly therefrom;
spaced-apart upper side wall sections extending from each lower side wall extending upwardly and inclined toward the bushings longitudinal axis;
a top wall provided with a material receiving opening interconnecting said upper side wall sections;
funnel means mounted adjacent said top wall for directing the material into said bushing;
cooling means provided adjacent the bottom portion of said funnel means for maintaining a temperature, adjacent said opening, which will prevent the material from adhering and accumulating in a region adjacent its entry through said opening; and
opposed end walls interconnecting said base plate and said side wall sections, each of said end walls including a terminal extending therefrom.

25. The apparatus of claim 24 wherein said upper side wall sections meet an associated side wall at an angle, facing inwardly of said bushing, of at least 90°.

26. The apparatus of claim 24 further including baffle means provided between said opening and said base plate for reducing hydrostatic pressure over the apertures.

27. The apparatus of claim 2 wherein said hollow core means is cylindrical in form.

28. The apparatus of claim 27 wherein said side walls include arcuate portions spaced radially from said core means.

* * * * *